United States Patent [19]

Paff

[11] Patent Number: 5,164,827
[45] Date of Patent: Nov. 17, 1992

[54] SURVEILLANCE SYSTEM WITH MASTER CAMERA CONTROL OF SLAVE CAMERAS

[75] Inventor: Robert Paff, Boca Raton, Fla.

[73] Assignee: Sensormatic Electronics Corporation, Deerfield Beach, Fla.

[21] Appl. No.: 748,756

[22] Filed: Aug. 22, 1991

[51] Int. Cl.⁵ .............................................. H04N 7/18
[52] U.S. Cl. ...................................... 358/108; 358/210
[58] Field of Search ................ 358/210, 108, 87, 185, 358/181, 225

[56] References Cited

U.S. PATENT DOCUMENTS

| | | | |
|---|---|---|---|
| 4,027,329 | 5/1977 | Coutta | 358/210 X |
| 4,190,863 | 2/1980 | Dischert et al. | 358/210 |
| 4,321,625 | 3/1982 | Smith | 358/210 |
| 4,517,593 | 5/1985 | Keller et al. | 358/87 X |
| 4,709,265 | 11/1987 | Silverman et al. | 358/210 X |
| 4,881,122 | 11/1989 | Murakami | 358/210 X |

Primary Examiner—Victor R. Kostak
Attorney, Agent, or Firm—Robin, Blecker, Daley & Driscoll

[57] ABSTRACT

A camera surveillance system in which a master adjustable camera selects a position in a premises and transmits information related to the selected position to a slave adjustable camera. Based on this related information, the slave adjustable camera trains on or views the selected position.

30 Claims, 4 Drawing Sheets

X,Y
S = 36,32 = SUSPECT
MD = 39,54 = MASTER DOME

| | X,Y | |
|---|---|---|
| S | =36,32 | = SUSPECT |
| MD | =39,54 | = MASTER DOME |
| SD2 | =14, 15 | = SLAVE DOME 2 |

SURVEILLANCE SYSTEM WITH MASTER CAMERA CONTROL OF SLAVE CAMERAS

FIELD OF THE INVENTION

This invention relates to surveillance systems for providing visual surveillance of a premises and, in particular, to a system and method for controlling one or more surveillance devices to simultaneously view an object within the premises.

BACKGROUND OF THE INVENTION

In video surveillance systems currently available, it is common to have multiple adjustable video cameras located throughout a premises. A security operator, located at a master control panel, has the capability of individually adjusting the viewing or optical axis of each camera by changing the pan and tilt angles of the camera. The operator also has the capability of adjusting the zoom and the focus states of each camera. In this manner, the security operator can sequentially train the optical axes and, therefore, the fields of view of selected cameras on a desired location or object within the premises, thereby advantageously affording multiple viewing angles thereof.

The advantages of multiple viewing angles are readily appreciated in situations where a subject is moving about a premises. As the subject moves, physical parts of the premises, such as doors, walls and furniture, temporarily prevent various cameras from viewing the subject. Also, the subject may be facing away from a single camera thereby shielding the subject's activity or preventing viewing of the subject's face. By simultaneously tracking the subject with more than one camera, multiple viewing angles of the subject are provided and the aforementioned problems are minimized.

In present video surveillance systems, it is very difficult for a security operator to simultaneously control two cameras while tracking a subject moving through a premises. For example, the operator, while viewing the video signal of a first camera, must adjust the optical axis of the first camera, by means of a joystick (or other control device) which controls the panning and tilting of the camera, until the desired subject is viewed. At the same time, or closely thereafter, the operator, while viewing the video output of a second camera, must manipulate a second joystick so as to pan and tilt the second camera to adjust the optical axis of the second camera until the subject is also viewed by the second camera. The operator, thus, often finds himself or herself trying to control the first camera with one hand, and the second camera with the other hand, while watching the video signals of both the first and second cameras, to try to keep both cameras trained on the subject.

As can be appreciated, the difficulty of tracking a subject in this way distracts the operator from the primary task of observing and detecting anomalous situations or actions by the subject. Further, as the number of cameras being used to simultaneously track a subject increases above two, it becomes increasingly difficult, if not impossible, for an operator to effectively track the subject.

Still further, as a subject moves beyond the range of a camera, the operator must determine and manually select the address of a different camera to be included in the tracking. Upon selecting the new address, which in and of itself is a distraction to the operator, the optical axis of the newly selected camera is initially in an unknown state. Therefore, the operator must spend an inordinate amount of time initially panning and tilting the newly selected camera to adjust its optical axis such that it is trained on the subject.

It is, therefore, an object of the present invention to provide a camera surveillance system and method which do not have the aforementioned disadvantages of the known surveillance systems.

It is also an object of the present invention to provide a camera surveillance system and method with multiple surveillance devices and in which improved simultaneous control of the multiple surveillance devices is also provided.

It is a further object of the present invention to provide a camera surveillance system and method with which an operator can easily track, with multiple surveillance cameras, a subject moving through a premises.

SUMMARY OF THE INVENTION

In accordance with the principles of the present invention, the above and other objectives are realized in a camera surveillance system and method wherein a master adjustable camera means selects a position in a premises by training its optical axis on the position. Communication means responsive to the master adjustable camera means then communicates to other adjustable camera means (slave adjustable cameras means) in the system information relating to the selected position. Based upon the received information certain of the slave adjustable cameras means, automatically move to adjust their respective optical axes. Preferably, this adjustment causes the optical axes of these cameras to also be trained on the selected position. In this manner, a security operator need only control a master adjustable camera means so that it's optical axis is trained on a subject, while a number of other adjustable slave camera means will then automatically follow this adjustment and also be trained on the subject.

In the embodiment of the invention to be disclosed hereinafter, each slave adjustable camera means, based on the information from the master adjustable camera means, determines whether it is within a predetermined range of the selected position. If within this range, the slave adjustable camera means then adjusts its optical axis to train on the selected position.

Also, in the embodiment of the invention to be disclosed hereinafter, the master adjustable camera means selects a position relative to a predetermined horizontal plane. The information related to the selected position is then such as to permit a determination of the relative location of the selected position in this predetermined horizontal plane. The positional location is determined by the master adjustable camera means based on its tilt angle, i.e., the angle of its optical axis with respect to a predetermined vertical direction, its pan angle, i.e., the angle of the projection of its optical axis in a horizontal plane relative to a predetermined horizontal direction, its height above the preselected plane and the relative position of its projection into such plane.

DESCRIPTION OF THE DRAWINGS

The above and other features and aspects of the present invention will become more apparent upon reading the following detailed description in conjunction with accompanying drawings, in which.

DETAILED DESCRIPTION OF THE INVENTION

Figure 1:
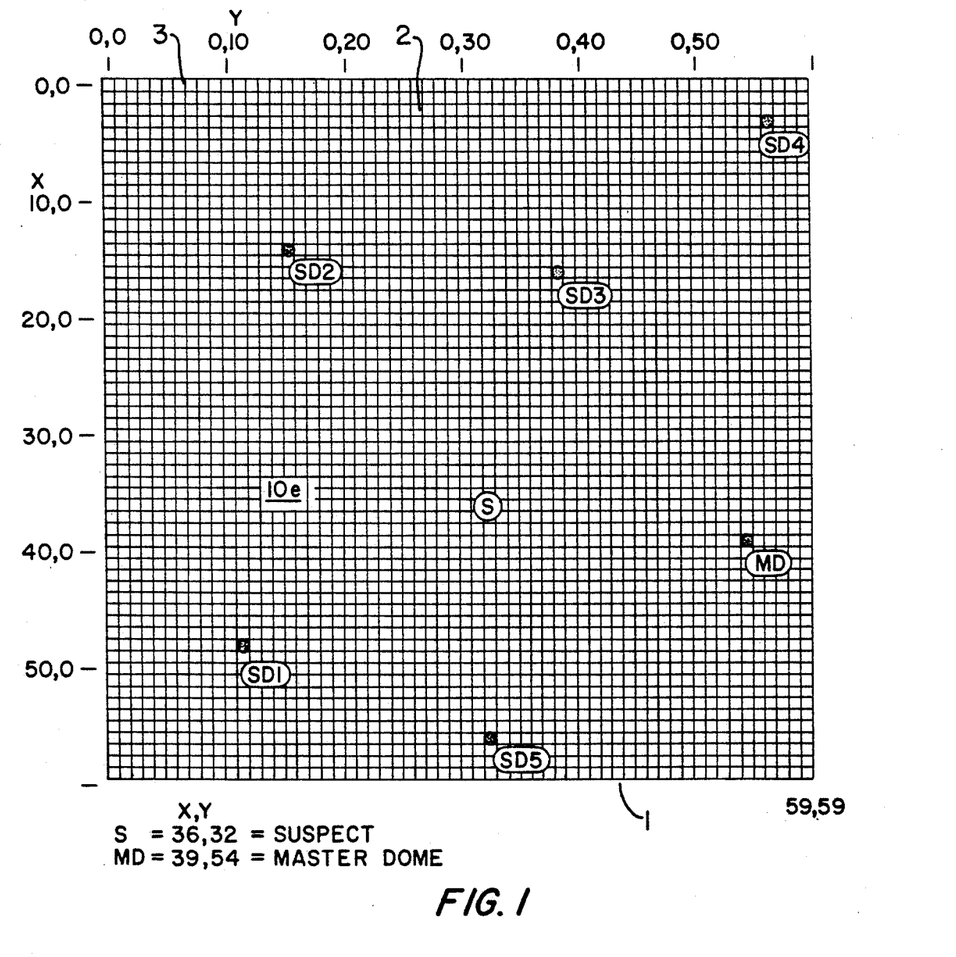
FIG. 1 shows a surveillance system in accordance with the principles of the present invention.
Figure 6:
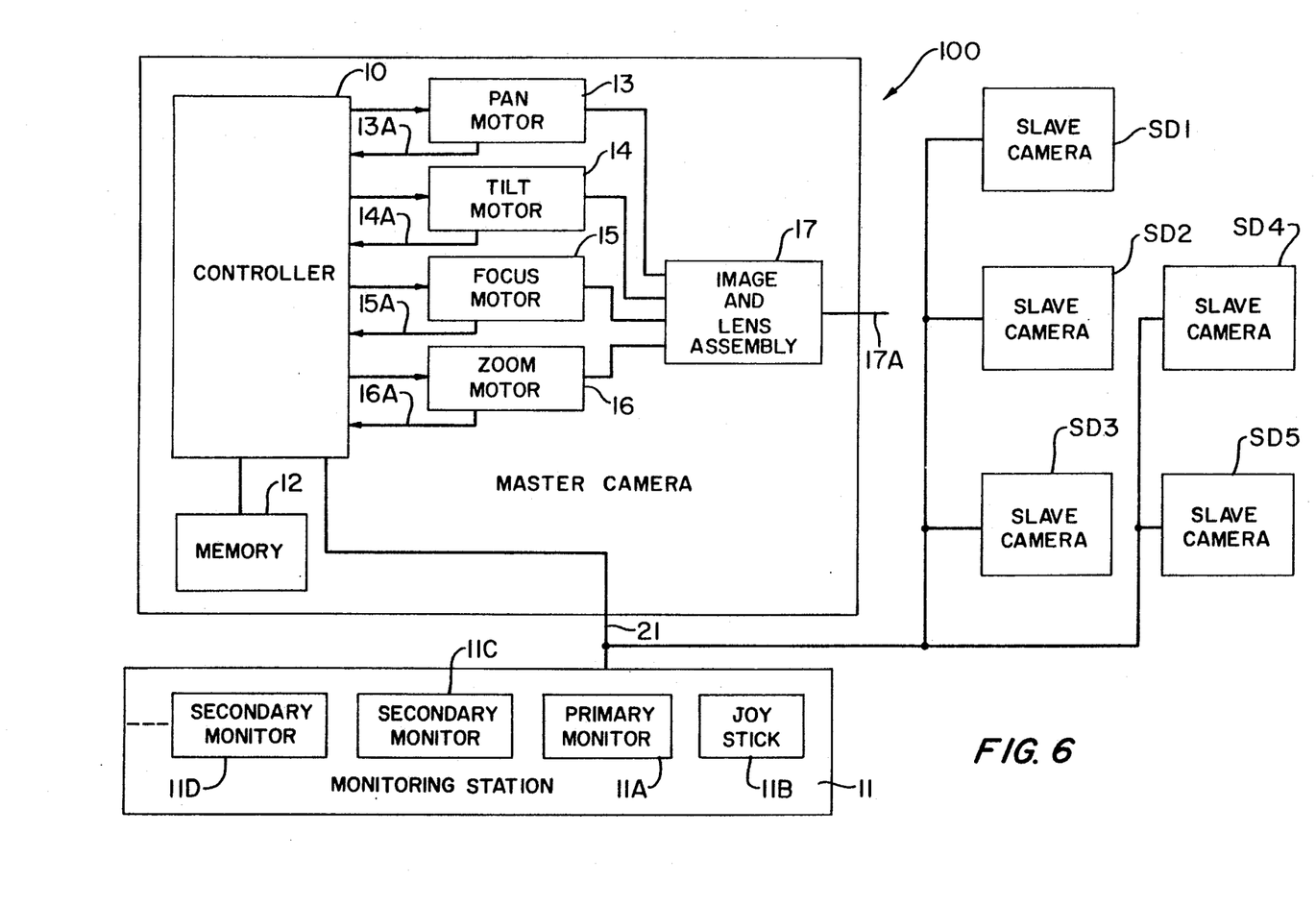
FIG. 6 is a block diagram showing in greater detail the surveillance system of FIGS. 1-5.

In FIG. 1, a premises 1 is under the surveillance of a surveillance system 100 in accordance with the principles of the present invention. As shown in FIGS. 1 and 6, the surveillance system 100 comprises a master camera MD and slave cameras SD1-SD5 which are distributed around the premises 1.

Referring to FIG. 6, the master camera MD comprises a controller 10, such as a microprocessor or dedicated hardware, which bidirectionally communicates with a monitoring station 11 and with slave cameras SD1-SD5 over bidirectional communications paths 21. The master camera MD also comprises a pan motor 13, a tilt motor 14, a focus motor 15 and a zoom motor 16 which control an image and lens assembly 17.

Control signals for driving these motors are provided by the controller 10. The motors, in turn, have feedback outputs 13A-16A which provide information relating to the respective motor's current position to the controller 10.

Suitable drive signals to the pan and tilt motors 13 and 14 result in the pan and tilt angles of the image and lens assembly 17 being adjusted. These angles, in turn, control the position of the viewing direction or optical axis 17A of the assembly. Similarly, suitable drive signals to the focus and zoom motors 15 and 16 will result in adjustment of the focus and zoom states or conditions of the assembly 17.

A memory unit 12, such as a RAM or EEPROM, stores information for the master camera MD relative to a horizontal reference plane 2 (see, FIG. 1). The information stored in the memory unit 12 includes the relative coordinate position of the master camera MD as projected into the reference plane 2. It also includes the height of the master camera MD above this plane. Additionally, the memory 12 stores the pan angle and tilt angle of the master camera MD.

The controller 10 can read the information stored in the memory unit 12. The controller includes a mathematical processor which can perform mathematical calculations, as described below, based on this and other stored information.

Each of the slave cameras SD1 to SD5 has the same component configuration as shown in FIG. 6 and above-described for the master camera MD. These components have not been specifically shown in FIG. 6 for ease of illustration.

The reference plane 2 defines the points or positions in the premises 1 which can be selected by the master camera MD. The master camera MD selects a position by causing the optical axis 17a of its image and camera assembly 17 to be focused on and intersect the position. By appropriately selecting the height of this plane relative to the height of the average human, the master camera MD, when directed at a position, will be able to view an entire human subject if located at the selected position. A typical height for the reference plane 2 might be four feet from the premises floor.

In accordance with the principles of the present invention, the master camera MD is adapted not only to train on or view a selected position in the reference plane 2, but also to provide information related to the selected position. This related information is then broadcast by the master camera MD over the paths 21 to the slave cameras SD1-SD5. Based upon this information, certain of the slave cameras will then adjust one or more of their respective pan, tilt, focus and zoom motors in a preselected manner. Preferably, the adjustments will result in the cameras also training on or viewing the selected position. In this way, once the master camera MD trains on or views a subject in the premises 1, certain of the slave cameras SD1-SD5 will automatically also train on or view the subject without the need for operator intervention. A more detailed explanation of the operation of the system 100 follows.

An operator, located at the monitoring station 11, views a primary monitor 11A which displays the video output of the master camera MD. The operator can also view a number of secondary monitors 11C, 11D, etc. which display the video outputs of one or more of the slave cameras SD1-SD5. By operating a joy stick 11B, or a similar device, the operator can transmit messages to the controller 10 of the master camera MD requesting that the pan angle and the tilt angle of the image and lens assembly 17 of the camera be changed. The controller 10, in response to the received request, drives the pan motor 13 and/or the tilt motor 14 in the desired direction.

During this movement, the feedback outputs 13A and 14A of the motors provide the controller 10 with an exact value for the current pan angle of the master camera MD and an exact value for the tilt angle of the camera. These values are stored by the controller 10 in its memory 12.

As the master camera MD is moved, the controller 10 periodically calculates, based on the aforesaid stored current pan and tilt angles and the stored master camera's height above and its projected coordinate position in the plane 2, the coordinates of the position (the selected position) in the plane intersected by the optical axis 17A of the camera. The calculated coordinates are then broadcast to all the slave cameras SD1-SD5.

The slave cameras receive the broadcast at their respective controllers 10. Each controller 10 then calculates the range or distance of its slave camera to the selected position. This is accomplished utilizing the received coordinates of the selected position and stored information at the respective slave camera as to its coordinate position projected in the plane 2 and its height above the plane. If the calculated range is within a predetermined range, the controller 10 of the particular slave camera then determines that its respective image and lens assembly 17 should then also be trained on or view the selected position.

The controller 10 of the slave camera, thereupon, via its mathematical processor and using the above information, i.e., the coordinates of the selected position, the height of its respective slave camera above the reference plane 2, and the coordinate position of its respective slave camera, determines the pan and tilt angles needed to bring the optical axis 17A of the image and lens assembly of the slave camera to the selected position. The controller 10, once these angles are calculated, then addresses its pan and tilt motors to drive the camera to the selected position.

If the operator at the monitor station 11 is thus moving the master camera MD to follow a subject, the respective slave cameras in-range will also be moved automatically to follow the subject. The video from these in-range slave cameras available at the monitor station 11 will then automatically be coupled by the station to respective ones of the monitors 11C, 11D, etc. The operator is therefore provided with multiple views of the subject, i.e., views from the master and in-range slave cameras, without being distracted by having to control several cameras to obtain these views. As a result, the operator can concentrate on following and viewing the subject with the master camera MD.

In the above-discussed operation, the master camera performs calculations to determine the coordinates of the selected position in the reference plane 2. These coordinates are transmitted to each slave camera. Each slave camera, based upon such coordinates, then calculates range and, if within a preselected range, determines the pan and tilt angles needed to bring the camera to the selected position.

However, it is within the contemplation of the present invention for the master camera MD to send information related to the selected position and for the slave cameras to calculate the coordinates of the selected position in the plane 2 based on this information and other stored information at the slave cameras.

For example, each slave camera can store information as to its coordinate position in and its height above the plane 2 and as to the coordinates and height relative to the plane 2 of the master camera and each of the other slave cameras. With this information at each slave camera, the master camera need only transmit information as to its pan and tilt angles when trained on the selected position. After receiving this information, the controller at each slave camera can use this information and its stored information to calculate the coordinates corresponding to the selected position and from these coordinates and the stored information it can determine the pan and tilt angles for training on the selected position. A more detailed explanation of calculating the pan and tilt angles for a selected position in the reference plane 2 for the master camera MD and slave cameras SD1-SD5 is given below.

More particularly, as shown in FIG. 1, the horizontal plane 2 is segmented into a checkerboard coordinate grid, with each box 3 of the coordinate grid measuring one foot by one foot. The 0,0 coordinate position of the grid is located in the upper left hand corner of FIG. 1 and the 59,59 coordinate position is located in the lower right hand corner of FIG. 1. As can be appreciated, the size of each grid box 3, and the location of the origin of the grid with respect to the premises 1 is arbitrary, and the values selected in this example are for illustrative purposes only.

The master camera MD is mounted at a vertical height $H_{MD}$ above the coordinates (39, 54) of the horizontal plane 2. The master camera MD thus has stored in its memory 12 both its vertical height value $H_{MD}$ and its projected coordinates (39, 54) in the horizontal plane 2. Slave camera SD2 is at a vertical height of $H_{SD2}$ above coordinates (14, 15) of the plane 2. The slave camera SD2 also has stored in its memory 12 both its vertical height value $H_{SD2}$ and its projected coordinates (14, 15) in the plane 2. A subject S, who is to be tracked by the surveillance system, is located at coordinate position (36, 32) in the horizontal plane 2.

To track the subject S, the operator at the control station 11 moves his or her joy stick control 11B to provide signals to the master camera MD. These signals cause the camera to adjust its pan and tilt angles to train the optical axis 17A of the image and lens assembly 17 of the master camera so that this axis intersects the coordinate position (36, 32) of the subject. Accordingly, the master camera now views the subject and the image of the subject appears on the monitor 11A. The master camera MD then calculates the coordinate position of the subject S in the plane 2.

Figure 2:
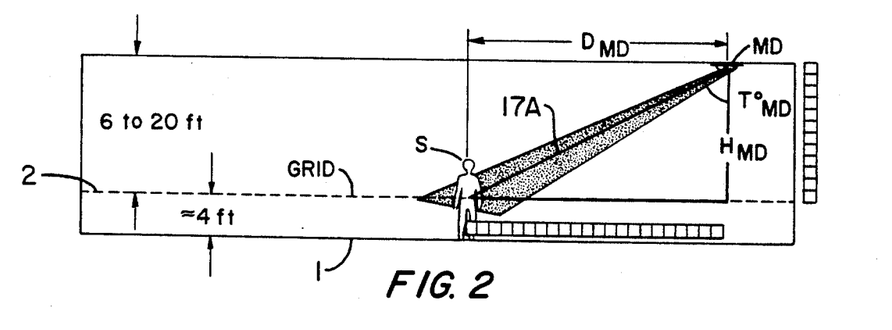
FIG. 2 shows, in side view, a master camera of the surveillance system of FIG. 1 viewing a subject.

More particularly, FIG. 2 is a side view of the premises 1 showing the optical axis 17A of the master camera MD intersecting the plane 2 at the position of the subject S. The master camera MD first calculates via its controller 10 the distance $D_{MD}$ in the plane 2 between the master camera MD and the subject S using the formula $D_{MD} = H_{MD}/ \tan T°_{MD}$, where $H_{MD}$ is, as above-indicated, the vertical height of the master camera MD above the horizontal plane 2 and $T°_{MD}$ is the tilt angle of the master camera MD. For example, with a tilt angle $T°_{MD}$ of 28° and a height $H_{MD}$ of 12 feet, the distance $D_{MD}$ to the subject is 22.56 feet.

Figure 3:
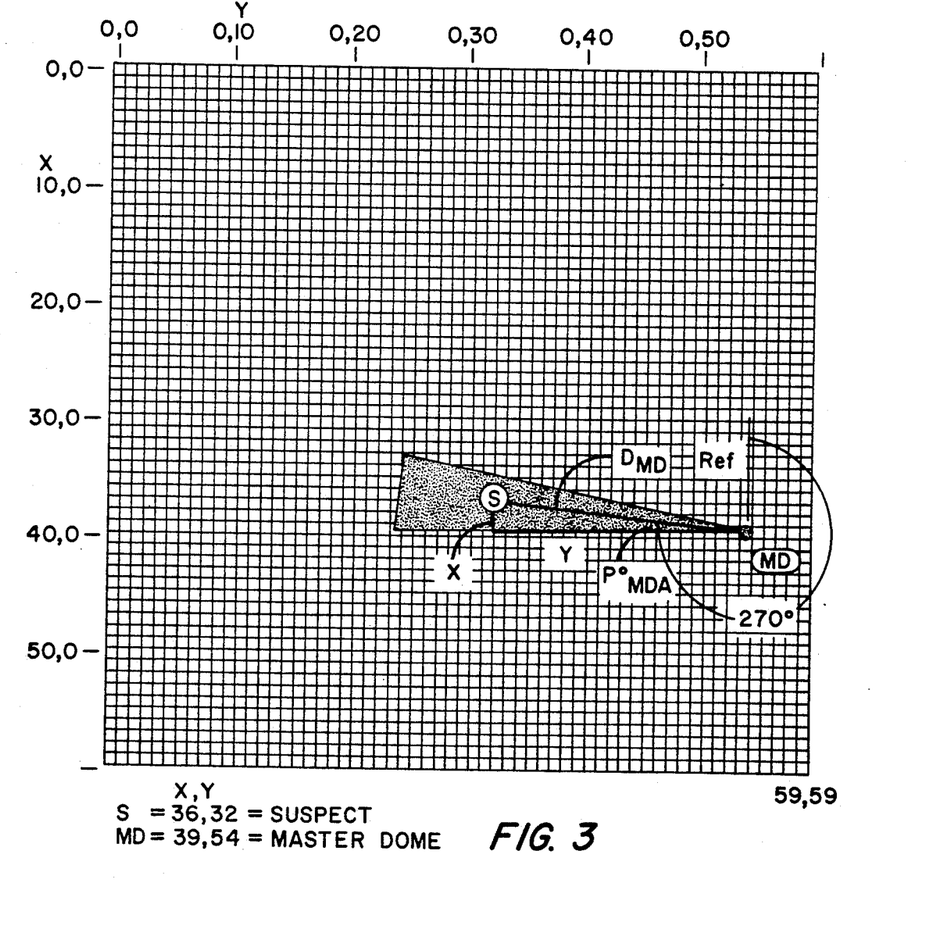
FIG. 3 illustrates the coordinate position of the point at which a subject being viewed by the master camera of FIG. 2 intersects with a preselected horizontal plane.

Referring now to FIG. 3, with the distance $D_{MD}$ known, the master camera MD then, via its controller 10, determines the coordinate position in the plane 2 of the subject S relative to the projected coordinate position of the master camera in the plane. It does this by first determining the master camera's adjusted pan angle $P°_{MDA}$. This is derived by modifying the camera's pan angle $P°_{MD}$ depending on the quadrant it is in. In the example shown in FIG. 3, since the pan angle is in the fourth quadrant, 270° is subtracted from the actual pan angle to obtain the adjusted pan angle. For example, with a pan angle $P°_{MD}$ of 277°, $P°_{MDA} = 277° - 270° = 7°$.

The controller 10 of the master camera MD then performs three calculations based on the above information. First it calculates the X offset using the formula $X = \sin(P°_{MDA}) \cdot D_{MD}$. For example, with $P° = 7°$ and $D = 22.56$ feet, $X = 2.75$ feet. Next the master camera calculates the Y offset using the formula $Y = X/\tan P°_{MDA}$. For example, with $P°_{MDA} = 7°$ and $X = 2.75$ feet, $Y = 22.4$ feet. Finally, the controller determines the coordinate position of the subject S in the plane 2 by adding or subtracting the X and Y offsets from the x,y stored coordinate position of the master camera MD. In the present example, the X coordinate of the subject S = the X coordinate of the master camera (39) minus the X offset (2.75) = 36.25. The Y coordinate of the subject S = the Y coordinate of the master camera (54) minus the Y offset (22.4) = 31.6. So the coordinate position of the subject is 36,32 (rounded off).

The master camera MD then broadcasts the coordinate position of the subject S and a desired range value to all the slave cameras SD1-SD5. The slave cameras SD1-SD5 respond in a similar manner to this broadcast message. Only the response of the camera SD2 will be specifically discussed.

More particularly, the slave camera SD2 first determines the distance between its projected position in the plane 2 and the received coordinate position in the plane 2 of the subject S using the Pythagorean Theorem. Thus, referring to FIG. 5, the slave camera SD2 determines the X and Y offsets between itself and the subject S position by calculating the difference between its own coordinate position and the coordinate position of the subject S. The distance to the subject is then calculated using the formula D=sqr root of $X^2+Y^2$. For example, with the coordinate position of the subject=(36, 32) and the position of a slave camera SD2=(14, 15), the difference would be X=22 and Y=17. The distance $D_{SD2}$ between the slave camera SD2 and the subject S is then equal the sqr root of $(22^2+17^2)=27.8$ feet.

Figure 5:
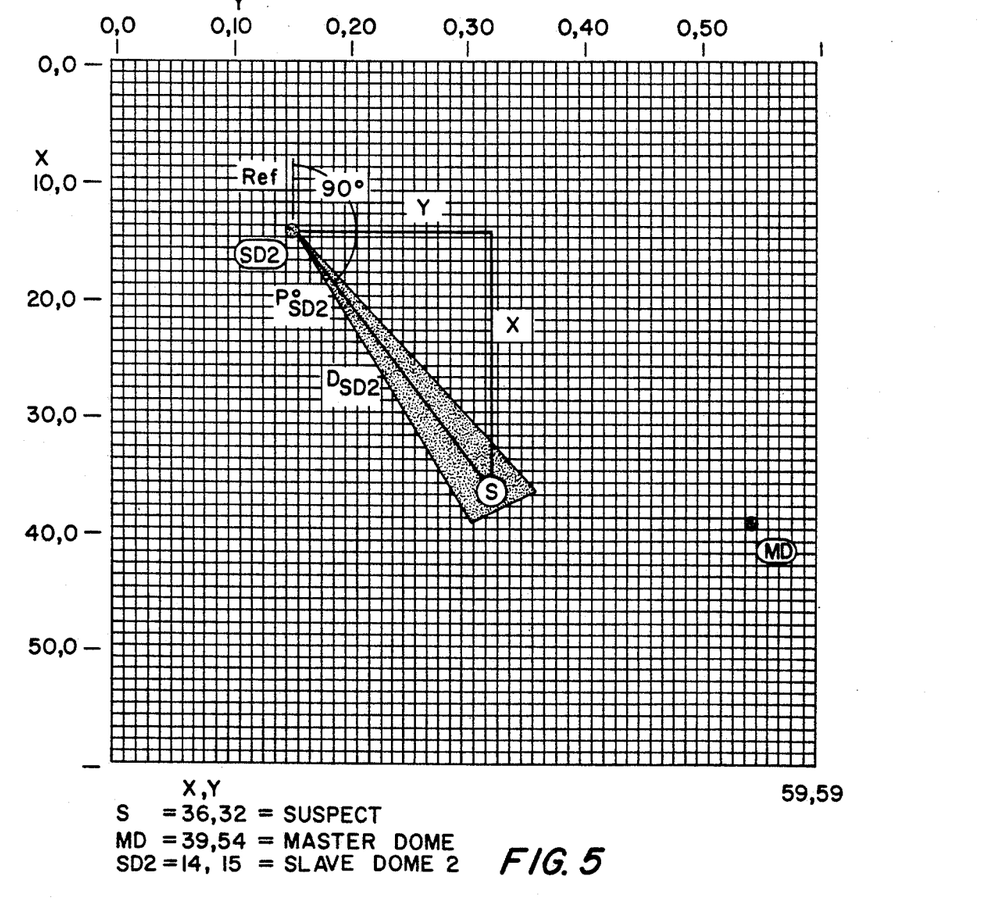
FIG. 5 illustrates pictorally the determination of the of the pan angle for the slave camera of FIG. 4.

If the distance from a slave camera to the subject S is determined to be within the desired range broadcast by the master camera MD (say a radius of 30 feet), the slave camera SD2 determines that it must then adjust its pan and tilt angles so the optical axis of the camera also intersects the horizontal plane 2 at the coordinates of the subject S.

The slave camera's adjustment of its pan angle is again described with reference to FIG. 5. The slave camera SD2, knowing the distance $D_{SD2}$ to the subject S and the offset X can calculate the adjusted pan angle $P°_{SDA}$ based on the formula $P°_{SDA}$=arcsine of $X/D_{SD2}$. For example, with $D_{SD2}=27.8$ feet and X=22, the adjusted Pan angle $P°_{SDA}=52.3°$. Since the subject is in the lower right quadrant, 90° is added to $P°_{SDA}$ to obtain the actual pan angle $P°_{SD}=142.3°$ relative to the reference vector $V_{ref}$.

Figure 4:
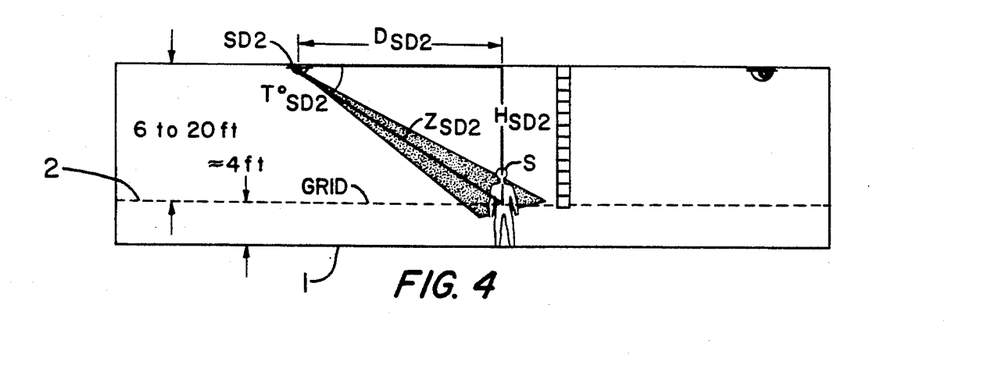
FIG. 4, also in side view, shows a slave camera of the system of FIG. 1.

Referring to FIG. 4, the slave camera SD2 then calculates the tilt angle $T°_{SD2}$ by first calculating the direct distance to the subject using the formula $Z_{SD2}$=sqr root of $D^2_{SD2}+H^2_{SD2}$. It then calculates the tilt angle using the formula T°hd SD2=arcsine of $H_{SD2}/Z_{SD2}$. For example, with $D_{SD2}=27.8$ feet and $H_{SD2}=12$, then $Z_{HD2}=30.28$ feet° and the tilt angle $T°_{SD2}=23.35°$.

It should be noted that any of the cameras in the system 1 can be switched to take the role of the master camera. The operator at the station 11 can effect this change.

Also, as above-noted, the master camera broadcasts updates of the coordinates of the selected position (i.e., the subject's position) so that the slave cameras in range also follow the subject's movement with the master camera. The rate of updates transmitted by the master camera can be based on the degree of movement of the subject S. If the operator is panning and tilting the master camera MD to follow the subject, the master camera will cause broadcast of updates to occur more frequently, so that any slave camera can reposition itself to maintain a view of the subject. If the operator stops the master camera, no further updates are required.

Additionally, as can be appreciated, as a subject moves around the premises 1, some slave cameras which are initially out-of-range may come in-range of the subject and thus begin to follow the subject with the master camera. When a slave camera comes in-range, it reports this condition to the station 11 which can then automatically connect the video from the in-range slave camera to any one of the available secondary montiors 11, 11C, 11D, etc. Conversely, a slave camera which is in-range may become out-range in which case it will cease to track the subject. Under these circumstances, the out-of-range slave camera also reports its out-of-range condition to the station 11. The station 11 then automatically removes the video of the out-of-range slave camera from the secondary monitor where it is being displayed, making this monitor available for other in-range slave cameras.

In addition to transmitting information relating to the coordinates of the subject S, the master camera MD can also broadcast information relating to the zooming status of the master camera. The slave cameras SD1-SD5, responsive to this information, can then adjust their own zooming states or conditions so that the subject is viewed at approximately the same magnification as with the master camera. In this manner, if the zooming state of the master camera is set to wide angle so that a large group of subjects can be tracked through the premises, the slave cameras will also be set to a wide angle position. Conversely, if the zooming state of the master camera is set tight so as to track a single individual through the premises, the slave cameras similarly will have a tight zoom setting. Still further, the master camera can broadcast information regarding its focus state to the slave cameras.

The station 11 can be provided with a graphics capability which, based on the coordinate position of a subject, locates an icon (graphical representation) of the subject on a floor plan of the premises 1 that is displayed on the station monitor. This would indicate the location of the subject relative to the floor plan of the premises.

In all cases it is understood that the above described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. A camera surveillance system for providing visual surveillance of a location, comprising:
   a master adjustable camera means having an adjustable optical axis, said master adjustable camera means selecting a position in said location along said adjustable optical axis of said master adjustable camera means;
   communication means for communicating information relating to said selected position; and
   one or more slave adjustable camera means, a particular slave adjustable camera means having an adjustable optical axis and being responsive to said information related to said selected position communicated by said communication means for adjusting the adjustable optical axis of the particular slave adjustable camera means.

2. A camera surveillance system in accordance with claim 1 wherein:
   said adjusting of the adjustable optical axis of a particular slave adjustable camera means is such as to direct the adjustable optical axis of the particular slave adjustable camera means at said selected position if the distance of the particular adjustable camera means to said selected position is equal to or less than a predetermined distance;
   and the adjusting of the adjustable optical axis of a particular slave adjustable camera means is such as to not direct the adjustable optical axis of the particular slave adjustable camera means at said selected position if the distance of the particular adjustable camera means to said selected position is greater than said predetermined distance.

3. A camera surveillance system in accordance with claim 2 further comprising:
   a monitoring station responsive to said master adjustable camera means and said one or more slave adjustable camera means, said monitoring station including a primary monitor for displaying the image being viewed by said master adjustable camera means and one or more secondary monitors for selectively displaying the images being viewed by said one or more slave adjustable camera means.

4. A camera surveillance system in accordance with claim 3 wherein:
said monitoring station includes means for automatically enabling displaying of the image being viewed by a particular slave adjustable camera means on a secondary monitor when the distance of the particular slave adjustable camera means to the selected position becomes equal to or less than said predetermined distance.

5. A camera surveillance system in accordance with claim 4 wherein:
said monitoring station further includes means for automatically disabling displaying of the image being viewed by a particular slave adjustable camera means on a secondary monitor when the distance of the particular slave adjustable camera means to the selected position becomes greater than said preselected distance.

6. A camera surveillance system in accordance with claim 1 wherein:
said adjusting of the adjustable optical axis of a particular slave adjustable camera means is such as to direct the adjustable optical axis of the particular slave adjustable camera means at said selected position.

7. A camera surveillance system in accordance with claim 6 wherein:
said selected position is in a predetermined horizontal plane in said location.

8. A camera surveillance system in accordance with claim 7 wherein:
said information includes the relative location of said selected position in said predetermined horizontal plane.

9. A camera surveillance system in accordance with claim 8 wherein:
said master adjustable camera means defines: a pan angle; a tilt angle; a height relative to said predetermined horizontal plane; and a relative position with respect to its projection in said horizontal plane;
and said master adjustable camera means calculates said relative location of said selected position using said pan and tilt angles, said height of said master adjustable camera means and said relative position of said master adjustable camera means in said plane.

10. A camera surveillance system in accordance with claim 9 wherein:
a particular slave adjustable camera means, responsive to said information related to said selected position communicated by said communication means, determines a pan angle and a tilt angle of the particular slave adjustable camera means and adjusts said optical axis of the particular adjustable camera means in accordance with said determined pan and tilt angles, whereby said optical axis of said particular slave adjustable camera means is made to intersect said selected position.

11. A camera surveillance system in accordance with claim 7 wherein:
said master adjustable camera means defines: a pan angle; and a tilt angle;
and said related information includes said pan and tilt angles.

12. A camera surveillance system in accordance with claim 11 wherein:
a particular slave adjustable camera means stores information with respect to the height of said master adjustable camera means relative to said predetermined horizontal plane and the relative position of said master adjustable cameras projected into said predetermined horizontal plane;
and a particular slave adjustable camera means uses said height and relative position information and said related information to determine a pan angle and a tilt angle of the particular slave adjustable camera means and adjusts said optical axis of the particular slave adjustable camera means in accordance with said determined pan and tilt angles, whereby said optical axis of said slave adjustable camera means is made to intersect said selected position.

13. A camera surveillance system in accordance with claim 1 further comprising:
control station means for causing said master adjustable camera to select said position.

14. A camera surveillance system in accordance with claim 1 wherein:
said related information includes focus information of said master adjustable camera means.

15. A camera surveillance system in accordance with claim 1 wherein:
said related information includes zoom information of said master adjustable camera means.

16. A method for providing visual surveillance of a location, comprising:
selecting with a master adjustable camera means having an adjustable optical axis, a position in said location along said adjustable optical axis of said master adjustable camera means;
communicating information relating to said selected position; and
responsive to said communicated information related to said selected position, adjusting the adjustable optical axis of one or more slave adjustable camera means.

17. A method in accordance with claim 16 wherein:
said adjusting of the adjustable optical axis of a particular slave adjustable camera means is such as to direct the adjustable optical axis of the particular slave adjustable camera means at said selected position if the distance of the particular adjustable camera means to said selected position is equal to or less than a predetermined distance;
and the adjusting of the adjustable optical axis of a particular slave adjustable camera means is such as to not direct the adjustable optical axis of the particular slave adjustable camera means at said selected position if the distance of the particular adjustable camera means to said selected position is greater than said predetermined distance.

18. A method in accordance with claim 17 further comprising:
displaying at a monitoring station on a primary monitor the image being viewed by said master adjustable camera means and selectively on one or more secondary monitors the images being viewed by said one or more slave adjustable camera means.

19. A method in accordance with claim 18 wherein:
said step of displaying includes automatically enabling displaying the image being viewed by a particular slave adjustable camera means when the distance of the particular slave adjustable camera means to the selected position becomes equal to or less than said predetermined distance.

20. A method in accordance with claim 19 wherein:
said step of displaying further includes automatically disabling displaying of the image being viewed by a particular slave adjustable camera means on a secondary monitor when the distance of the particular slave adjustable camera means to the selected position becomes greater than said predetermined distance.

21. A method in accordance with claim 16 wherein:
said adjusting of said adjustable optical axis of a particular slave adjustable camera means is such as to direct the adjustable optical axis of the particular slave adjustable camera means at said selected position.

22. A method in accordance with claim 21 wherein:
said selected position is in a predetermined horizontal plane in said location.

23. A camera surveillance system in accordance with claim 22 wherein:
said information includes the relative location of said selected position in said predetermined horizontal plane.

24. A method in accordance with claim 23 wherein:
said master adjustable camera means defines: a pan angle; a tilt angle; a height relative to said predetermined horizontal plane; and a relative position with respect to its projection in said horizontal plane;
and said method further includes said master adjustable camera means calculating said relative location of said selected position using said pan and tilt angles, said height of said master adjustable camera means and said relative position of said master adjustable camera means in said plane.

25. A method in accordance with claim 24 wherein:
said method further includes for a particular slave adjustable camera means, responsive to said communicated related information, determining a pan angle and a tilt angle of the particular slave adjustable camera means and adjusting said optical axis of the particular slave adjustable camera means in accordance with said determined pan and tilt angles, whereby said optical axis of the particular slave adjustable camera means is made to intersect said selected position.

26. A method in accordance with claim 22 wherein:
said master adjustable camera means defines: a pan angle; and a tilt angle;
and said related information includes said pan and tilt angles.

27. A method in accordance with claim 26 wherein:
a particular slave adjustable camera means stores information with respect to the height of said master adjustable camera means relative to said predetermined horizontal plane and the relative position of said master adjustable cameras projected into said predetermined horizontal plane;
and said method further includes for a particular slave adjustable camera means, using said height and relative position information and said relative information, determining a pan angle and a tilt angle of the particular slave adjustable camera means and adjusting said optical axis of the particular slave adjustable camera means in accordance with said determined pan and tilt angles, whereby said optical axis of the particular slave adjustable camera means is made to intersect said selected position.

28. A method in accordance with claim 16 further comprising:
remotely causing said master adjustable camera means to select said position.

29. A method in accordance with claim 16 wherein:
said related information includes focus information of said master adjustable camera means.

30. A method in accordance with claim 16 wherein:
said related information includes zoom information of said master adjustable camera means.

* * * * *

UNITED STATES PATENT AND TRADEMARK OFFICE
CERTIFICATE OF CORRECTION

PATENT NO. : 5,164,827

DATED : November 17, 1992

INVENTOR(S) : Robert Paff

It is certified that error appears in the above-identified patent and that said Letters Patent is hereby corrected as shown below:

Col. 7, line 57. Change "montiors" to -- monitors --

Signed and Sealed this

Eleventh Day of January, 1994

*Attest:*

BRUCE LEHMAN

*Attesting Officer*     *Commissioner of Patents and Trademarks*